March 24, 1970 L. M. VALLESE 3,502,879
LIGHT SCANNING DEVICE
Filed March 31, 1966
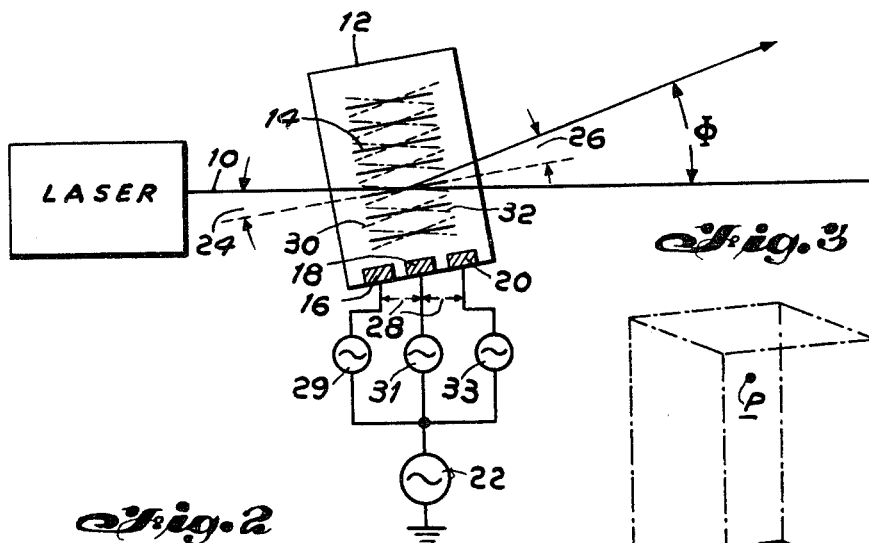
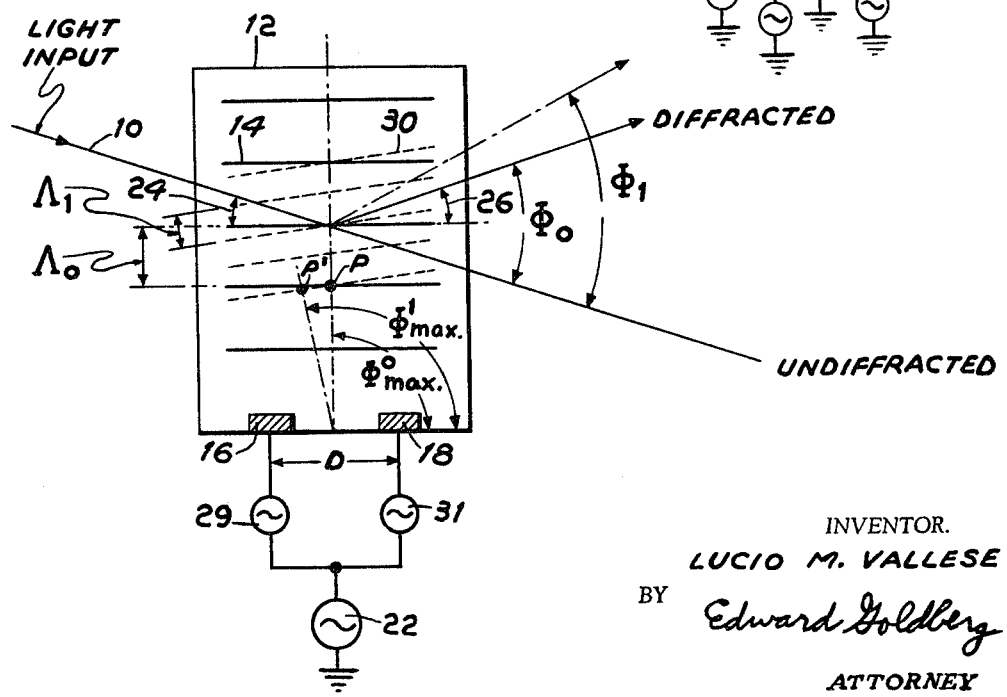
INVENTOR.
LUCIO M. VALLESE
BY Edward Goldberg
ATTORNEY

United States Patent Office 3,502,879
Patented Mar. 24, 1970

3,502,879
LIGHT SCANNING DEVICE
Lucio M. Vallese, Glen Ridge, N.J., assignor to International Telephone and Telegraph Corporation, a corporation of Delaware
Filed Mar. 31, 1966, Ser. No. 539,032
Int. Cl. H04b 9/00
U.S. Cl. 250—199                          6 Claims

ABSTRACT OF THE DISCLOSURE

A beam of light is deflected and scanned by varying the sound wave pattern of an ultrasonic cell in the path of the beam. A plurality of transducers produce a parallel line wave front with a varying wavelength to vary the angle of reflection of the beam. The transducers are energized in a predetermined time variable phase relationship to cause an angular scan of the pattern in synchronism with the variable frequency and wavelength to maintain the angle of incidence equal to the angle of reflection.

---

This invention relates to a system for deflecting and scanning of light or laser beams and particularly to a novel arrangement for controlling an ultrasonic cell which provides large angular scanning of high intensity beams of light.

It has been generally known that ultrasonic cells deflect collimated light beams projected thereon in accordance with sound wave patterns in the cell which produce variations of the density of the liquid of the cell. A maximum output of light from a cell is obtained when the angle of incidence of the beam is equal to the angle of reflection. This occurs where light at a particular angle in a liquid medium is reflected from the peak or maximum point of a sound wave front. By varying the frequency of the sound waves, the peak can be shifted with respect to the light beam to provide small angular scans of the order of one or two degrees. However, it is difficult to maintain the desired angular relationships while producing optimum amplitude and scanning action.

It is therefore the primary object of the present invention to provide an improved light scanning arrangement which will permit large angular variations while maintaining high intensity light output. It is a further object to provide a novel system for controlling the angular relationships of the light beam and sound waves in an ultrasonic cell to obtain optimum scanning and amplitude.

These objects are achieved by application of a phased array of transducers which provide electronic scanning of the sound beam through an angle within the cell. Since the angle of incidence of light will change with each change in angular orientation of the sound beam, the wavelength of the sound beam is modified in synchronism with the scan in order to maintain the desired angular relationship for maximum output. The resulting scan angle and rate of scan of the light beam is thus equal to that of the sound wave variation. The details of the invention will be more fully understood and other objects and advantages will become apparent in the following description and accompanying drawings wherein:

FIG. 1 shows a schematic representation of a system employing the novel arrangement of the invention;

FIG. 2 is an enlarged view of an ultrasonic cell showing the operation of the system, and FIG. 3 shows an embodiment utilizing a plurality of transducers arranged to provide two-dimensional scan variations.

A source of collimated light or a laser beam 10 is directed at an ultrasonic cell 12 containing a liquid such as water. The array of parallel lines 14 represent a grating formed by peaks of the sound wave front which is generated by a plurality of spaced transducers 16, 18 and 20, arranged in a common plane. These elements preferably include electrical connections which apply a high frequency alternating voltage, which may be in the order of 5 volts, from a common source 22 to a plurality of piezoelectric crystals for example, at one end of the cell. The light is directed at the cell so that the angle of incidence 24 of the beam will equal the angle of reflection 26. When this occurs at the peaks of the sound wave, the maximum light output is obtained. This is commonly known as the Bragg angle. The basic mathematics and theory of this operation have been described by G. W. Willard in the Journal of the Acoustical Society of America, volume 21, pages 101–108, March 1949. A further general discussion of light diffraction by ultrasonic waves may be found in the text "Principles of Optics," 1959 edition, by M. Born and E. Wolf.

As an example, if $d$ is taken as the width of the sound wave front or cell, with $\Lambda$ and $\lambda$ respectively the wavelengths of sound in the liquid and of light in a vacuum, and with $n$ the index of refraction of the liquid, the condition for Bragg diffraction of the first order is:

$$d \gg n\Lambda^2/\lambda$$

The corresponding angle between incident or undiffracted and reflected or diffracted light is $\phi \cong \lambda/\Lambda = \lambda f/v$, where $f$ is the frequency of the sound wave, and $v$ is its velocity of propagation in the liquid. Maximum light output is obtained when the plane tangential to the sound wave front bisects the angle $\phi$, so that the ultrasonic cell is tilted at one half this angle to obtain optimum reflection.

It is apparent that variation of the frequency of the sound wave by a suitable frequency modulation system will change the wavelength between peaks and thus change the location of the point at which the light beam impinges and is reflected. A small angular scan of the light beam, in the order of one to two degrees, will be obtained in this manner. However, since the light beam is not continuously impinging at the same angle and peak point of the varying sound wave, the amplitude is reduced and the scan is limited. Light reflected from portions of the wave away from the peaks tends to cancel due to interference so that the light is effectively controlled by the maximum point of the wave.

By energizing the cell with a plurality of transducers, as shown in FIG. 1, the sound wave front can be scanned. The transducers are preferably fed from a common frequency source 22 or are suitably locked in synchronism to operate at the same modulated frequency and at a predetermined phase angle and spacing 28 with respect to one another so that a continuous oscillating scan action occurs. The phase angle is applied by suitable phase modulators 29, 31, 33 connected in series with respective transducers 16, 18, 20, with phase modulator 29, for example, supplying a reference signal or zero phase angle. The scanning is indicated by dashed lines 30, 32 wherein the position or direction of the sound wave front is rotated through an angle within the cell. For each angular orientation of the sound wave beam a different angle of incidence is obtained. However, if the wavelength of the sound wave is modified in synchronism with the scan, the angles of incidence and reflection are maintained equal and occur at the peaks of the wave front to continuously provide the maximum output amplitude. The scan angle of the light beam is thus equal to that of the sound wave, and the rate of scan is equal to the rate of angular scan of the sound wave. Due to the common signal source for frequency and phase modulation, the required synchronism is inherently maintained in the system.

In order to further illustrate this operation, two transducers 16, 18 are positioned at distance D as shown in FIG. 2. Lines 14 and 30 indicate respectively the original sound wave front and a position after scanning through a small angle. $\phi_0$ indicates the diffracted beam angle before scanning and $\phi_1$ is the angle after scanning, with $\Lambda_0$ and $\Lambda_1$ indicating respective wavelengths of the sound wave. If these transducers are point sources which radiate isotropically and with the same intensity $E_0$ within a 180° angle, the sound wave amplitude at any point P sufficiently remote within the liquid is:

$$|E| = |E_0 + E_0 \epsilon^{j\psi}| = 2E \cos \frac{\psi}{2}$$

where $$\psi = \frac{2\pi D}{\Lambda} \cos \phi + \alpha$$

$\phi$ is the angular orientation of P, and $\alpha$ is the phase angle between the two point sources. Thus, if $\alpha$ is a periodic function of time, the amplitude E becomes maximum in correspondence with the angular orientation $\phi_{max}$ for which $\psi = 0$, or $$\phi_{max} = \cos^{-1}\left(\frac{-\alpha \Lambda}{2\pi D}\right) = \cos^{-1}\left(\frac{-\alpha v}{2\pi f D}\right)$$

In a practical case, both $\alpha$ and $\Lambda$, or $\alpha$ and $f$, are made to vary with time such that the plane of the sound wave front bisects the angle between incident and diffracted beams of light. Thus, if at a frequency $f = f_0$, the angle $\phi_{0max}$ is $\pi/2$ and the angular deviation between incident and diffracted light is $\phi_0 = \lambda f_0/v$, the corresponding conditions at a frequency $f_1 > f_0$ are $\phi_1 = \lambda f_1/v > \phi_0$ and $$\phi'_{max} = \frac{\pi}{2} + \frac{\phi_1 - \phi_0}{2} = \frac{\pi}{2} + \frac{\lambda(f_1 - f_0)}{v}$$

The phase angle $\alpha$ is expressed in general with the relationship:

$$\alpha = \frac{-2\pi f D}{v} \cos \phi_{max}$$

where both $f$ and $\phi_{max}$ vary with time. When $f = f$, $\alpha = 0$; and when $f = f_1 > f_0$ $$\alpha = \frac{-2\pi f_1 D}{v} \cos \left[\frac{\pi}{2} + \frac{\lambda(f_1 - f_0)}{v}\right]$$

The period of the $\alpha(t)$ function is equal to that of the modulating frequency or deviation $f_1 - f_0$.

In a practical realization similar to that illustrated in FIG. 2, one may have for example, a wavelength $\lambda = 6328$ A. for a helium-neon laser, a carrier frequency $$f_0 = \frac{\omega_0}{2\pi} = 50 \text{ mc.}$$

a modulating frequency $$\Delta f = \frac{\Delta \omega}{2\pi} = \pm 10 \text{ mc.}$$

and a phase modulation $$f_m = \frac{\Delta \omega}{2\pi} = 1 \text{ mc.}$$

With an instantaneous frequency $f = (\omega_0 + \Delta \omega \sin \omega_m t)/2\pi$, the phase angle variation is:

$$\alpha(t) = \frac{-2\pi D}{v}(f_0 + \Delta f \sin \omega_m t) \cos\left(\frac{\pi}{2} + \frac{\lambda \Delta f}{v} \sin \omega_m t\right)$$

In this case for example, the frequency change from 40 to 60 mc. occurs at a 1 mc. rate so that the wavelength of the sound wave varies in synchronism with the angular scan. Although the rigorous expression of the function $\alpha(t)$ is cumbersome, in practice approximations may be used with statisfactory results. Theoretically, with this system angular scans of up to $\pm 180°$ are obtainable.

The above-illustrated case of two transducers may be extended by consideration of more than two transducers arranged either collinearly as in FIG. 1, or in a matrix. As in the example of FIG. 1, three point source transducers fed with the same amplitude $E_0$, and with phase angles 0, $\alpha$ and $2\alpha$, and placed at respective distances D, provide a resultant field amplitude at a point P:

$$|E| = E_0 |1 + \epsilon^{j\psi_1} + \epsilon^{j\psi_2}|$$

where $$\psi_1 = \frac{2\pi f D}{v} \cos \phi + \alpha, \quad \psi_2 = \frac{2\pi f D}{v} \cos \phi + 2\alpha$$

Use of more than two collinear transducer permits the realization of a sound wave beam of higher resolution.

As another example, a matrix of four transducers, positioned in two planes, is shown is FIG. 3. By extension of the previous concept these sources may be fed with such phase angles that the resultant sound beams scans the solid angle defined by the ultrasonic cell, and thus provides a two-dimensional scanning of the light beam.

It may thus be seen that the present invention represents a novel light-scanning device which provides improved control of an ultrasonic cell to permit large angular scans and light output. While several embodiments have been illustrated, the invention is not limited to the exact forms or uses shown, and other variations may be made in the particular design and configuration without departing from the scope of the invention set forth in the appended claims.

What is claimed is:
1. A light scanning device comprising:
   a source of light projecting a beam therefrom;
   an ultrasonic cell positioned at a predetermined angle with respect to said light beam;
   a plurality of collinear transducers having a predetermined spacing therebetween and producing a sound wave pattern in said cell having a wave front of parallel lines of peaks spaced at a predetermined wavelength, said light being directed at said cell so that the light beam is reflected from said peaks at an angle equal to the angle of incidence of said beam;
   means applying a variable frequency alternating voltage to said transducers to vary the wavelength of the sound wave pattern and angle of reflection of said light beam; and
   means for energizing said plurality of transducers at a predetermined time variable phase angle with respect to one another to cause an angular scan of said parallel line sound wave pattern which continuously rotates with respect to the longitudinal axis of said cell in synchronism with said variable frequency and wavelength to maintain said angle of incidence of said light beam equal to said angle of reflection.
2. The device of claim 1 wherein said light source projects a laser beam.

3. The device of claim 2 wherein said cell is positioned at one half the angle between said incident and reflected light beams.

4. The device of claim 3 wherein said variable frequency means is connected as a common source of voltage for said means for energizing said transducers.

5. The device of claim 4 wherein said transducers comprise a plurality of piezoelectric crystals spaced apart in a common plane at one end of said cell.

6. The device of claim 4 wherein said transducers are positioned in more than one plane to provide angular scan of said sound wave in more than one plane.

References Cited

UNITED STATES PATENTS

| 3,306,977 | 2/1967 | Brueggemann | 350—161 |
| 3,324,906 | 1/1969 | Korpel | 250—199 |

ROBERT L. GRIFFIN, Primary Examiner

ALBERT J. MAYER, Assistant Examiner

U.S. Cl. X.R.

350—161